(12) United States Patent
Falcioni et al.

(10) Patent No.: US 8,760,307 B2
(45) Date of Patent: Jun. 24, 2014

(54) ELECTRIC APPLIANCE MONITORING DEVICE

(75) Inventors: Paolo Falcioni, Fabriano (IT); Paolo Santonicola, Fabriano (IT); Irene Orienti, Castelplanio (IT)

(73) Assignee: Indesit Company S.p.A., Fabriano (IT)

( * ) Notice: Subject to any disclaimer, the term of this patent is extended or adjusted under 35 U.S.C. 154(b) by 880 days.

(21) Appl. No.: 10/585,711

(22) Filed: Jul. 10, 2006

(65) Prior Publication Data

US 2009/0009287 A1 Jan. 8, 2009

(30) Foreign Application Priority Data

Jul. 11, 2005 (EP) ..................................... 05425500

(51) Int. Cl.
*G08B 21/00* (2006.01)

(52) U.S. Cl.
USPC ............ 340/657; 340/664; 340/585; 340/3.1; 340/3.43; 702/182; 702/183

(58) Field of Classification Search
USPC ......... 340/657–664, 585, 679, 539.1, 539.24, 340/539.22, 545.6, 3.1, 3.3, 3.32, 340/3.42–3.44, 3.9; 379/106.01; 702/182–185, 187–189; 62/127
See application file for complete search history.

(56) References Cited

U.S. PATENT DOCUMENTS

| | | | | |
|---|---|---|---|---|
| 5,315,847 | A * | 5/1994 | Takeda et al. ................. | 68/12.02 |
| 5,934,302 | A * | 8/1999 | Nemelka ........................... | 137/1 |
| 5,960,234 | A * | 9/1999 | Shibaki et al. .................. | 399/75 |
| 6,453,687 | B2 * | 9/2002 | Sharood et al. ................. | 62/127 |
| 6,823,878 | B1 * | 11/2004 | Gadini ......................... | 134/58 D |
| 6,956,461 | B2 * | 10/2005 | Yoon et al. ................ | 340/310.11 |
| 7,188,002 | B2 * | 3/2007 | Chapman et al. ............. | 700/276 |
| 2001/0025349 | A1 * | 9/2001 | Sharood et al. ................. | 713/340 |
| 2001/0049846 | A1 * | 12/2001 | Guzzi et al. ........................ | 8/158 |
| 2002/0095269 | A1 | 7/2002 | Natalini et al. | |
| 2002/0124081 | A1 * | 9/2002 | Primm et al. .................. | 709/224 |
| 2003/0116177 | A1 * | 6/2003 | Appel et al. ..................... | 134/18 |
| 2003/0196277 | A1 * | 10/2003 | Hallman et al. .................. | 8/142 |
| 2006/0197667 | A1 * | 9/2006 | Jung .......................... | 340/572.1 |

FOREIGN PATENT DOCUMENTS

EP 1744248 A1 1/2007

OTHER PUBLICATIONS

European Search Report for European Patent Application No. 05455500, mail date Mar. 21, 2006 by L. Gentili, 3 pages.

* cited by examiner

*Primary Examiner* — Mohammad Ghayour
*Assistant Examiner* — Nay Tun
(74) *Attorney, Agent, or Firm* — Cesari and McKenna, LLP

(57) ABSTRACT

The present invention relates to a monitoring device (9) for an electric appliance (1), comprising electronic control means and data and/or information storage means. Said monitoring device (9) is typically connected to a first communication network (70A, 70B) through first interface means (7) and to a second communication network (80) through second interface means (8). Said first communication network (70A, 70B) is adapted to connect at least one sensing device (93, 94, 95, 96), being capable of measuring at least one value of at least one physical quantity related to the monitored electric appliance (1), to the monitoring device (9). According to the present invention, the monitoring device (9) receives the value of at least one physical quantity through the first interface means (7), and the electronic control means use said value of at least one physical quantity in order to obtain at least one piece of information related to the monitored electric appliance (1).

16 Claims, 2 Drawing Sheets

ELECTRIC APPLIANCE MONITORING DEVICE

Figure 1:
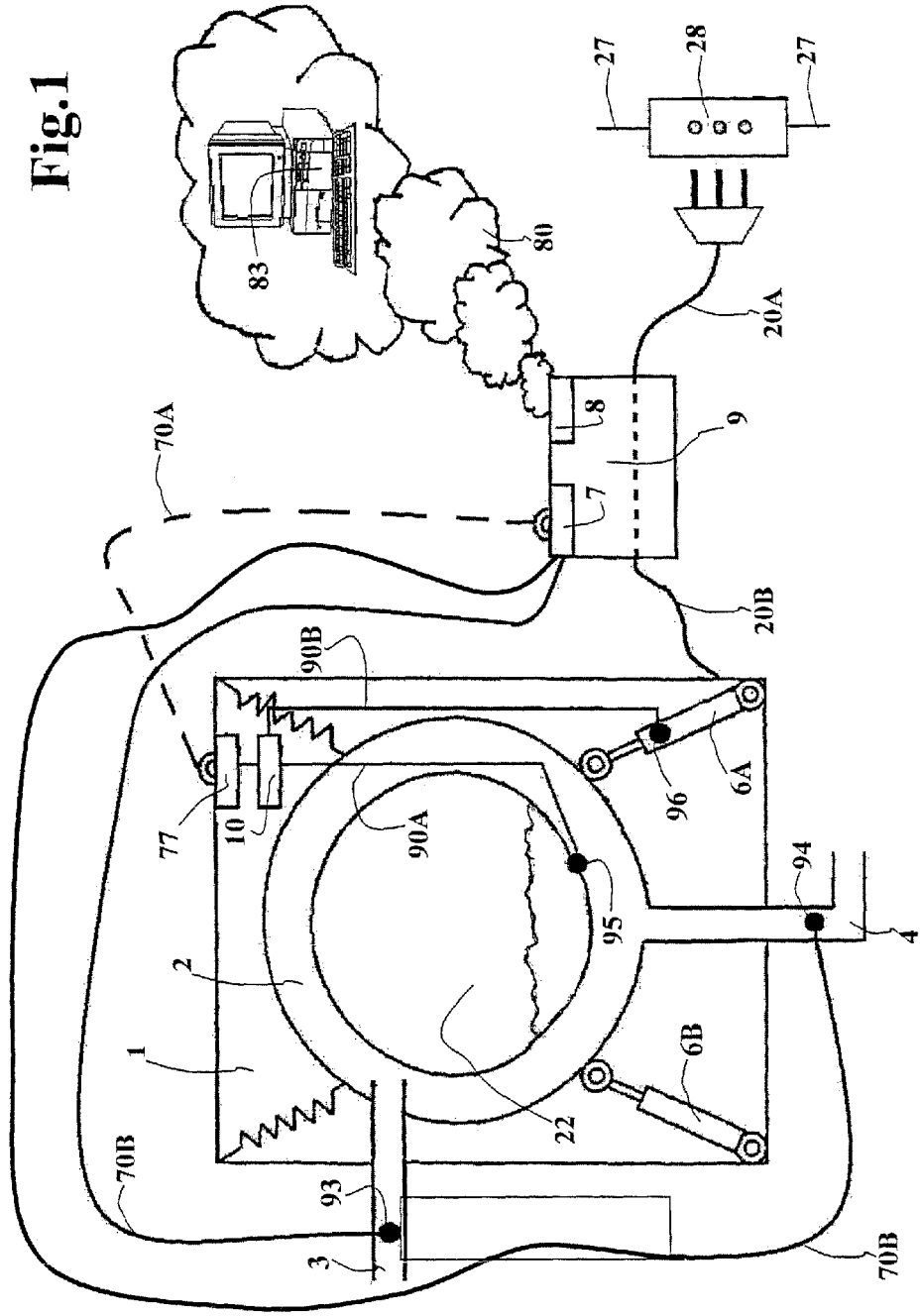

The present invention relates to a monitoring device for an electric appliance, in particular for a household appliance, according to the preamble of claim 1.

Nowadays, more and more attention is being paid to the use of systems allowing to monitor household appliances also from a remote location in respect to the place of installation.

To this purpose, a particularly advantageous architecture is described in the Patent Application WO03/44923, which provides an electric appliance monitoring device using a remote center for collecting and processing information sent by a group of household appliances, which may be of a different type, brand or model.

According to said architecture, each electric appliance is monitored separately through a monitoring device being interposed between an electric appliance and the corresponding power outlet and measuring one or more "external" electric quantities related to the electric appliance (e.g. momentary and/or effective voltage at the ends of the electric appliance, momentary and/or effective voltage absorbed by the electric appliance, momentary and/or average power absorbed by the electric appliance), said electric appliance being supplied electrically through the monitoring device. Based on the electric measurements carried out, the monitoring device generates and stores in a non-volatile memory information related to the state and operation of the electric appliance. The monitoring device can also communicate with the "outer world"; in particular, it provides for sending the electric measurements and the information obtained from said measurements to a remote center (in particular by means of a suitable telephone interface). At the remote center an expert system is running, which consists of a series of software procedures being able to store in its own non-volatile memory and subsequently to process the electric measurements and the information received from various monitoring devices. The purpose of this architecture is to extract functional, statistical and diagnostic data related to individual household appliances.

The monitoring system according to the Patent Application WO03/44923 is very useful both to the user of a household appliance, who is thus offered a preventive maintenance service for his/her own product, and to the manufacturers of household appliances, who can thus collect information from a large number of household appliances in order to assess their performance and reliability as well as to analyze their actual use by the respective users.

However, the Applicant has noticed that the potentiality of the architecture according to the Patent Application WO03/44923 are not fully exploited in the household appliance field, in that the monitoring device described therein is only capable of performing "external" electric measurements, i.e. the state and the operation of the electric appliance is obtained indirectly; therefore, the performance of the whole monitoring system in which the monitoring device is installed turns out to be limited compared to its potentiality.

The general object of the present invention is to overcome the drawbacks of the known art.

A more specific object of the present invention is to provide a monitoring device which, when installed within a monitoring system being analogous to the one described in WO03/44923, may offer a remarkable enhancement in the completeness and reliability of the information concerning the monitored electric appliance.

Said objects are substantially achieved through the monitoring device incorporating the features described in the annexed claims, which represent an integral part of the present description.

The general idea at the basis of the present invention consists in employing a monitoring device which, in order to analyze the operation and state of the monitored electric appliance, uses not only "external" electric quantities, but also other physical quantities (being measured directly) related to the electric appliance and sent by suitable sensing devices.

Figure 2:
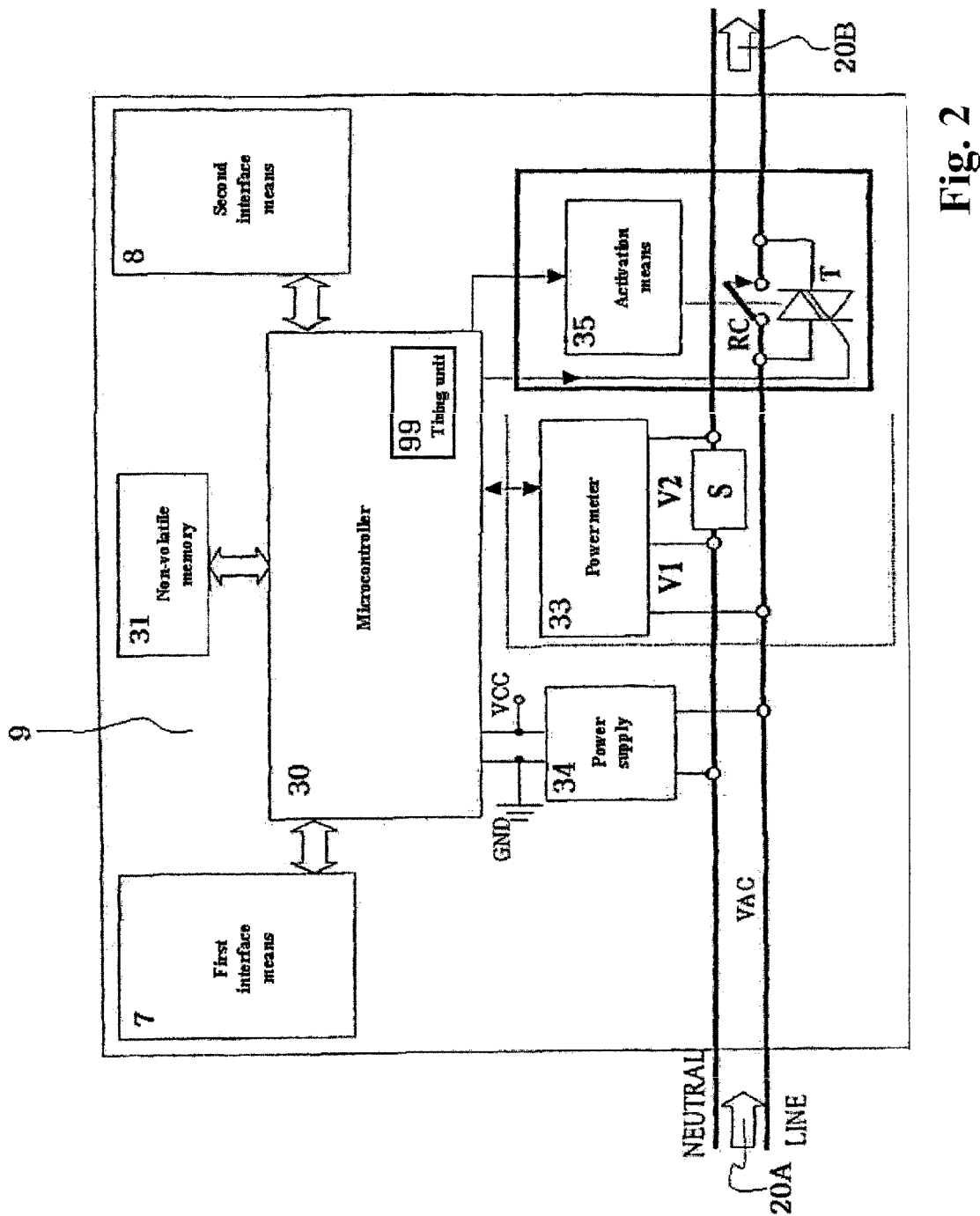

The monitoring device according to the present invention will become apparent, together with its further advantages, from the following detailed description and from the annexed drawings, which are supplied by way of non-limiting example, wherein:

FIG. 1 schematically shows a possible application of a possible embodiment of the monitoring device according to the present invention;

FIG. 2 schematically shows a possible layout of the functional elements within a possible embodiment of the monitoring device according to the present invention.

FIGS. 1 and 2 show a monitoring device 9 for an electric appliance, in particular for a household appliance, according to the present invention.

In the application example of the monitoring device 9 shown in FIG. 1, the electric appliance being monitored through the monitoring device 9 is a laundry washing machine 1 comprising:

i) an oscillating assembly, in its turn comprising a tub 2, adapted to contain the washing liquid, and a basket 22, adapted to contain the laundry to be washed and for moving it by means of a motor device (not shown in FIG. 1);

ii) suspension means, adapted to keep the oscillating assembly suspended with respect to the cabinet of the washing machine 1 and to damp the oscillations when the machine is operating, and comprising the pair of dampers 6A and 6B and the pair of springs shown in FIG. 1;

iii) electronic control means 10, being connected to means 77 to establish a connection with a communication network, which in FIG. 1 is the radiofrequency communication network 70A, but it could also be, without thereby departing from the inventive concepts of the present invention, a communication network using an electric cable (e.g. a telephone twisted pair) or an infrared or optical fiber line.

The washing machine 1 is connected to the hydraulic system through the inlet pipe 3, which is adapted to allow clean water to be supplied into the washing machine 1, and is connected to the drains through the drain pipe 4, adapted to allow the washing liquid to be discharged from the washing machine 1. Furthermore, the washing machine 1 is supplied electrically through the power cable 20B.

FIG. 1 shows, as a non-limiting example, some sensing adapted to detect different physical quantities being representative of the state and/or operation of the washing machine 1. In particular, the sensing devices of FIG. 1 are the following:

i) a flow sensor 93, adapted to measure the water flow rate supplied to the washing machine 1 to perform the wash treatment. In particular, said flow sensor 93 is, in the particular application shown in FIG. 1, a sensing device being positioned externally to the washing machine 1, along the inlet pipe 3;

ii) a conductivity sensor 94, adapted to measure the conductivity of the washing liquid drained from the washing machine 1 in order to detect, for example, the presence of any detergent residues in the washing liquid. In particular, said conductivity sensor 94 is, in the particular application shown in FIG. 1, a sensing device being positioned externally to the washing machine 1, along the drain pipe 4; said sensing device may be provided according to the teachings of the Patent Application EP582329;

iii) a temperature sensor 95, adapted to measure the temperature of the water contained in the tub 2 and used by the washing machine 1 to perform the wash treatment selected by the user; said sensor is internal to the washing machine 1. In particular, said temperature sensor 95 may be an NTC temperature sensor;

iv) a weight sensor 96, adapted to measure the weight of the contents of the oscillating assembly of the washing machine 1, in particular the weight of the laundry loaded by the user into the basket 22 before starting the wash treatment; said sensor is internal to the washing machine 1. In particular, said weight sensor 96 may be integrated into a damper of the washing machine 1 (damper 6A of FIG. 1) and be provided according to the teachings of the Patent Application EP1220961.

The sensing devices 93 and 94 are not connected to the electronic control means 10 of the washing machine 1; they transmit the detected data through a dedicated communication network, which in FIG. 1 is the cable communication network 70B (preferably, 70B is a serial communication network), but may also be, without thereby departing from the inventive concepts of the present invention, a radiofrequency communication network or an optical fiber communication network. The sensing devices 95 and 96, instead, are connected to the electronic control means 10 of the washing machine 1 through the electric cables 90A and 90B, respectively, and therefore transmit the detected data through the communication network 70A by using the communication means 77. In the washing machine 1 according to the present invention, the sensing devices 95 and 96, which have already been employed in some commercially available washing machines in order to allow the electronic control means to adapt the operation of the household appliance based on data detected by such sensing devices, thanks to the communication means 77 gain the capability of transferring the detected data outside the washing machine 1. In general, the communication means 77 allow everything being collected, stored or processed by the electronic control means 10 of the washing machine 1 to be transferred outside the household appliance.

It is apparent that the above sensing devices represent just a few examples of possible sensing devices related to the washing machine 1. Just like the above sensing devices, one may include in FIG. 1, without thereby departing from the inventive concepts of the present invention, a vibration sensor (accelerometer or extensometer) being associated with the cabinet of the washing machine 1, a sound pressure or intensity sensor (e.g. one or two microphones) inside the washing machine 1, an angular velocity sensor (e.g. an encoder) to measure the rotation speed of the basket 22 driven by the motor device, a sensor being capable of reading RFID labels (e.g. a "tag reader" according to the Patent Application EP1452636), or any other sensing device being capable of measuring the value of at least one physical quantity among the following: temperature, flow rate, conductivity, weight, absolute humidity, relative humidity, pressure, linear displacement, linear velocity, linear acceleration, angular displacement, angular velocity, angular acceleration, chemical concentration, sound pressure, sound intensity, light intensity, oscillation frequency, oscillation amplitude.

Likewise, the inventive concepts of the present invention would by no means be departed from if, instead of the washing machine 1, the electric appliance monitored through the monitoring device 9 were a clothes dryer, a washing/drying machine, a dishwasher, a refrigerator, a freezer, a refrigerator/freezer, an electric oven, a gas oven, a microwave oven, a gas cooking top, an electric cooking top, a magnetic induction cooking top, a kitchen hood, a conditioner, a gas boiler, an electric water heater, an air conditioner, a hair dryer, an iron, a Hi-Fi system, a mixer or any other electric kitchenware, a lighting device, an alarm device, and so on.

FIG. 1 shows an electric power source, in particular a power outlet 28 being connected to an electric power supply network 27, and a remote center 83 for collecting, storing and processing data and/or information. Said remote center 83 is connected to a communication network 80, which preferably may be an electric network, a radiofrequency network or a fixed or mobile telephone network, and may include an expert system such as the one described in the Patent Application WO03/44923.

The following description will often refer to a "first communication network" and a "second communication network". "First communication network" refers to any network or network group being suitable for connecting one or more devices being located in a house or an office to the monitoring device 9: in particular, in FIG. 1 the first communication network comprises both the radiofrequency network 70A and the cable communication network 70B, and the devices connected to the monitoring device 9 through the first communication network are the sensing devices 93, 94, 95 and 96. "Second communication network" refers to any network or network group being suitable for connecting the monitoring device 9 to a communication network (Internet network, GSM network, etc.) being external to the house or office wherein the monitoring device 9 is located: in particular, in FIG. 1 the second communication network is the communication network 80, which connects the monitoring device 9 to the remote center 83. In the illustrated example, the first and second networks are totally external to the device 9.

According to a preferred embodiment of the present invention, the monitoring device 9 is adapted to be interposed between the monitored electric appliance and an electric power source, and the electric appliance may be powered through the monitoring device 9. The monitoring device 9 shown in FIG. 1 is interposed between the power socket 28 and the washing machine 1: in fact, the power cable 20A of the monitoring device 9 is connected to the electric power source, whereas the power cable 20B of the washing machine 1 is connected to the monitoring device 9, so that the electric current runs through the monitoring device 9 before supplying the washing machine 1.

The electric appliance monitoring device 9 comprises electronic control means and data and/or information storage means, and is connected to the first communication network 70A or 70B through first interface means 7 and to the second communication network 80 through second interface means 8. In the schematic representation of FIG. 2, which is annexed to the present description as a non-limiting example, the electronic control means comprise the microcontroller 30, whereas the data and/or information storage means comprise the non-volatile memory 31. The first communication network 70A or 70B is adapted to connect to the monitoring device 9 at least one sensing device being capable of measuring the value of at least one physical quantity related to the monitored electric appliance. According to the present invention, the monitoring device 9 receives the above value of at least one physical quantity through the first interface means 7, and then the electronic control means use said value of at least one physical quantity in order to obtain at least one piece of information related to the monitored electric appliance.

The sensing devices 93, 94, 95 and 96 continuously detect the value of the associated physical quantity and, by using the first communication network 70A or 70B, send it to the monitoring device 9, which extracts it from the first communication network 70A or 70B through the first interface means 7. Likewise, also the values of other physical quantities being read by other sensing devices possibly incorporated into the washing machine 1 and not shown in FIG. 1, as well as the total or partial content of the non-volatile memory being associated with the electronic control means 10 of the washing machine 1, may be transferred to the monitoring device 9 through the first communication network 70A or 70B. The first interface means 7 of the monitoring device 9 comprise at least one communication node being capable of sending and receiving data and/or information according to a certain technology and a certain protocol (e.g. for radiofrequency communication, the first interface means 7 are compatible with a protocol such as Bluetooth, Z-Wave, ZigBee, etc.). In particular, the first interface means 7 of the monitoring device 9 according to FIG. 1 comprise a cable communication node being capable of receiving, among other things, the values of the physical quantities being measured by the sensing devices 93 and 94, as well as a radiofrequency communication node complying with a standard such as Bluetooth and being capable of receiving, among other things, the values of the physical quantities being measured by the sensing devices 95 and 96.

Once received by the first interface means 7, the value of a physical quantity coming from one of the sensing devices 93, 94, 95 and 96 is then transferred to the microcontroller 30, which, like the other circuit components of the monitoring device 9, is supplied electrically through power supply means 34 being connected to the domestic electric network and being capable of transforming the alternating voltage VAC of the domestic electric network into direct voltage VCC. The microcontroller 30 is adapted to perform a processing in order to obtain, also based on the value of a physical quantity sent by one of the sensing devices 93, 94, 95 and 96, at least one piece of information related to the monitored electric appliance, which may be a functional information, i.e. concerning the operating state of the monitored electric appliance, or a statistical information, i.e. concerning the usage of the monitored electric appliance, or a diagnostic information, i.e. concerning the efficiency condition of the monitored electric appliance or of a particular component of the monitored electric appliance. In the present description and in the annexed claims, these terms are therefore to be understood as follows:
i) "functional information" is information referring to the operating state of a certain household appliance (e.g. if the household appliance is a refrigerator, a functional piece of information may be the detection of an open door condition);
ii) "statistical information" is information referring to how a generic user is using a certain household appliance (e.g. if the household appliance is a laundry washing machine, a statistical piece of information may be the number of times the household appliance performs a certain wash treatment within a predefined time period);
iii) "diagnostic information" is information allowing to detect any anomalies and/or failures in the operation of the household appliance (e.g. if the household appliance is a refrigerator, a diagnostic piece of information may be the detection of a malfunction such as a leakage of coolant from the refrigerating circuit).

Because each value of the physical quantities measured by the sensing devices 93, 94, 95 and 96 is a piece of information being representative of the operating state of the washing machine 1, it follows that, in a particular case within the scope of the present invention, the information related to the monitored electric appliance may coincide with at least one of the values of the physical quantities detected by the sensing devices 93, 94, 95 and 96, being connected to the monitoring device 9 through the first communication network 70A or 70B (in the particular application shown in FIG. 1, a piece of information related to the washing machine may thus be the flow rate value detected by the sensor 93, or the washing liquid conductivity value detected by the sensor 94, or the temperature value detected by the sensor 95, or the weight value detected by the sensor 96).

The monitoring device 9 also comprises a timing unit 99. Said timing unit 99 (which may either be incorporated into the microcontroller 30 as shown in FIG. 2 or be external to the microcontroller 30) comprises a device working as a clock and is capable of communicating time information to the microcontroller. Through the timing unit 99, the monitoring device 9 can associate each value of at least one physical quantity with the time instant at which said value of at least one physical quantity is detected by one of the sensing devices 93, 94, 95 and 96. The timing unit 99, together with the non-volatile memory 31, allows the device to trace the history of the monitored electric appliance, in that it permits building, in the non-volatile memory 31, profiles being indicative of the trend within a predefined time period of a particular physical quantity or typology of information obtained by the microcontroller 30 based on the values detected by the sensing devices 93, 94, 95 and 96. Such profiles are made up of a plurality of values of a particular physical quantity or typology of information. These values are contained in the non-volatile memory 31 and are managed preferably in FIFO (First In First Out) mode, according to which the storage of the last value measured by the sensing devices 93, 94, 95 and 96 or of the last piece of information obtained by the microcontroller 30 causes the deletion of the oldest value or piece of information already stored in the non-volatile memory 31.

According to an extremely advantageous embodiment of the present invention, the information related to the monitored electric appliance may be obtained by the electronic control means of the monitoring device 9 not only on the basis of the value of at least one physical quantity detected by the sensing devices 93, 94, 95 and 96, but also on the basis of the value of at least one electric quantity (being "external" to the washing machine 1) detected by the monitoring device 9. More specifically, the information related to the monitored electric appliance coincides with the value of at least one electric quantity detected within the monitoring device 9. In said embodiment, in fact, the monitoring device 9 also comprises means 33 for measuring at least one electric quantity. Since the monitoring device 9 is interposed between the electric network 27 and the monitored electric appliance, the electric current supplying the electric appliance runs through the monitoring device 9 before reaching the electric appliance. Hence it is possible to perform, at the point where the monitoring device 9 is located, electric measurement operations along the electric line supplying the washing machine 1, for the purpose of detecting values of physical quantities being representative of the operating state of the washing machine 1. For this reason, the monitoring device 9 comprises the means 33 for measuring at least one electric quantity, which are capable of measuring at least one electric quantity among the following: momentary electric current drawn by the monitored electric appliance, line voltage applied to the monitored electric appliance, momentary electric power drawn by the monitored electric appliance, electric energy consumption of the monitored electric appliance within a predefined time period, power factor of the load represented by the monitored electric appliance, cos-phi of the load represented by the monitored electric appliance, and type of reactive power of the load represented by the monitored electric appliance. It must be specified that "power factor" refers to the ratio between the active power and the apparent power absorbed by the monitored electric appliance, while "cos-phi" refers to the phase displacement of the line sinusoidal voltage applied to the monitored electric appliance with respect to the sinusoidal electric current absorbed by the monitored electric appliance. According to a non-limiting embodiment example, the means 33 for measuring at least one electric quantity may consist of a so-called "power meter" block which, among other things, calculates the momentary electric current and power drawn by the washing machine 1 starting from a measurement of the voltage drop at the ends of the precision resistor S, which has a low thermal coefficient and a low ohmic value (the precision resistor S generally has a resistance of a few mΩ). The voltage drop at the ends of the precision resistor S and the current going through the resistor S are linked by Ohm's law.

Besides means for measuring at least one electric quantity, the monitoring device 9 may also comprise sensor means for measuring one or more environmental quantities, "environmental" referring to quantities whose values allow to trace the conditions of the environment where the monitored electric appliance is located (some examples of environmental quantities are temperature, absolute humidity, relative humidity, air velocity, chemical concentration of any substances, e.g. pollutants, etc.).

The timing unit 99 also permits to associate each value of at least one electric or environmental quantity with the time instant at which said value of at least one electric or environmental quantity is detected by the appropriate means inside the monitoring device 9. Therefore said timing unit 99, together with the non-volatile memory 31, allows to trace the history of the monitored electric appliance also by building in the non-volatile memory 31 profiles being indicative of the trend within a predefined time period of a particular electric quantity and being made up of a plurality of values of that electric quantity. Also for storing the values of electric quantities, the non-volatile memory 31 is preferably managed in FIFO (First In First Out) mode, according to which the storage of the last value measured by the means 33 for measuring at least one electric quantity causes the deletion of the oldest value already stored in the non-volatile memory 31 in a remote period of time.

In the embodiment of the present invention representing the best application of the timing unit 99, said timing unit 99 allows to perform an operation consisting in associating with a certain time instant t* the values of all the physical quantities detected by the sensing devices being external to the monitoring device 9 and the values of all the electric and environmental quantities detected at the time t* by the appropriate means being internal to the monitoring device 9. Thus it is possible to store in the non-volatile memory 31 (preferably managed in FIFO mode) tables which record, for every time instant $t_i$, the corresponding values of physical, electric and environmental quantities, as well as any functional, statistical and diagnostic information eventually obtained by the microcontroller 30 on the basis of the values of the physical, electric and environmental quantities detected at the time $t_i$. A particularly interesting feature is the possibility, on the part of the electronic control means of the monitoring device 9, of obtaining (and subsequently storing in the non-volatile memory 31 and/or transmitting to the remote center 83 through the second interface means 8) statistical and/or diagnostic information by comparing the detected values of at least one physical and/or electric quantity with one or more predefined values of said physical and/or electric quantity contained in the non-volatile memory 31. For instance, if the value of a certain physical or electric quantity X(t) is higher (or lower) than a predefined value X* contained in the non-volatile memory 31, used as a maximum (or minimum) threshold value of the physical or electric quantity X(t) for ensuring the correct operation of a particular component of the washing machine 1, the monitoring device 9 will then be able to obtain a diagnostic piece of information related to a malfunction and a possible risk of early failure of that particular component. Supposing that, by way of a non-limiting example, the quantity X(t) is the power absorbed by the washing machine 1, when a wash treatment is started there will be an additional draw of electric power by the electric resistance used for warming up the washing liquid employed for the treatment (the electric resistance dissipates a thermal power of approx. 2 kW). If the monitoring device 9 does not detect said additional electric power absorbed, it will realize that a fault has occurred in the electric resistance or in the electric circuit which should activate the electric resistance. Likewise, the monitoring device 9 will be able to obtain diagnostic information related to a malfunction of the washing machine 1 in the event that the microcontroller 31 verifies the existence, at a particular time instant t*, of a combination of values of physical and/or electric quantities being significantly different (based on the evaluation logic in the microcontroller 30) from that particular combination of values of the same physical and/or electric quantities contained in the non-volatile memory 31, representing the reference combination of physical and/or electric quantities, i.e. the combination that best represents the proper operation of the washing machine 1 at the time instant t*.

In the event that, on the basis of anomalous values of at least one physical quantity and/or at least one electric quantity, the microcontroller 30 of the monitoring device 9 detects the onset of a malfunction which requires, for safety reasons, that the washing machine 1 be immediately turned off, the monitoring device 9 will be capable of turning off the power supply to the washing machine 1. In fact, FIG. 2 shows a monitoring device 9 comprising a block composed of an RC relay having a normally closed movable contact and being driven by the activation means 35, and of a triac T, which eliminates the scintillation of the RC relay contact when it is switched. The microcontroller 30 controls said block through an on-off signal, thereby opening the RC relay and turning off the washing machine 1, if necessary.

When at least one piece of information related to the monitored electric appliance has been obtained, the monitoring device can make this information available in two different ways: by transferring it on the second communication network 80 through the second interface means 8, or by making it explicit through suitable means (not shown in FIG. 1), which may comprise a display and/or a warning lamp and/or a buzzer. If the monitoring device 9 is fitted with a display, it can communicate in full the functional, statistical or diagnostic information obtained by the microcontroller 30 to the user, whereas if it is just fitted with a warning lamp or a buzzer, typically it can only tell the user if said information is a diagnostic piece of information concerning a fault condition of a component of the washing machine 1 or an improper use of the washing machine 1 by the user.

According to the present invention, the second interface means 8 are used by the monitoring device 9 for transferring at least one piece of information related to the monitored electric appliance from the electronic control means to the second communication network 80, so as to make said information available at a remote location with respect to the monitoring device 9, thus allowing said information to be read and/or stored and/or processed remotely. The information obtained by the electronic control means and related to the monitored electric appliance is transferred, through the second communication network 80 (preferably an electric network, a radiofrequency network or a fixed or mobile telephone network), to a remote center 83.

If it is necessary to use the monitoring device 9 to monitor particular phenomena of the washing machine 1 which may change quickly in time and therefore require a high sampling frequency to be monitored properly, a problem arises due to the generation of a huge amount of information by the microcontroller 30, making the transmission of the information obtained by the electronic control means of the monitoring device 9, through the second interface means 80, extremely demanding. To solve this problem, the electronic control means are preferably capable of extrapolating, from a plurality of values of the same physical quantity, a data packet being representative of the evolution of said physical quantity within a predefined time period, and possibly also of using such a data packet to obtain at least one piece of information related to the monitored electric appliance. According to a non-limiting example, this operation may consist of a particular data compression using mathematical indexes for reconstructing a signal being representative of the trend of a particular physical quantity. For instance, supposing that a particular physical quantity $X(t)$ detected by the associated sensing device within a predefined time period has values of $X_1 - \ldots - X_i - \ldots - X_N$, in that order, if the first K values are nearly identical to one another and approximately equal to $X^{\#}$, and the last N-K values are also nearly identical to one another, but approximately equal to $X^{\S}$, the microcontroller 30 of the monitoring device 9 will be able to sum up the trend of the physical quantity $X(t)$ within the predefined time period by using just four parameters (value=$X^{\#}$, number of times=K, value=$X^{\S}$, number of times=N-K), instead of transmitting all N values of the physical quantity $X(t)$ to the remote center 83. Likewise, if the physical quantity $X(t)$ detected by the associated sensing device within the predefined time period has approximately linear decreasing values of $X_1 - \ldots - X_i - \ldots - X_N$, in that order, the microcontroller 30 of the monitoring device 9 will in this case be able to sum up the trend of the physical quantity $X(t)$ within the predefined time period by using just three parameters (value=$X_1$, value=$X_N$, equation representing the trend from $X_1$ to $X_N$ of order=1).

At the remote center 83, the information related to the washing machine 1 coming from the monitoring device 9 can be compared with other previous information received from the same monitoring device 9 and/or other information received from other monitoring devices according to the present invention, which monitor washing machines being similar to the washing machine 1. By performing a comparison among information received from the same monitoring device 9 at different time instants, the remote center 83 acts as a preventive maintenance center for the washing machine 1, in that it detects any risks of failure of the components of the washing machine 1 and allows the maintenance personnel to repair such components before they actually fail and prevent the user from using the household appliance. If the remote center 83 performs a comparison among a plurality of information received from a series of monitoring devices which monitor a series of washing machines being analogous to the washing machine 1, it acts as a center for extracting statistical information being representative of the usage of a washing machine by a plurality of users (e.g. at the remote center 83 it is possible to calculate the average quantity of laundry loaded by the users for each wash treatment, or to determine which is the most used program among a series of wash programs available in the washing machine). This statistical information may also be used, at the level of the remote center 83, to extract parameters being indicative of the wear condition of the monitored washing machines (in this case, the statistical information will also act as diagnostic information used for preventive purposes).

It is therefore manifest that the present invention offers, through the electric appliance monitoring device described above and substantially defined by the annexed claims, the advantage of giving an electric appliance monitoring system such a flexibility as to allow it to adapt itself to the monitoring of any typology of electric appliance, such a reliability as to ensure the generation of information being always reliable and accurate, and such a completeness of information as to ensure the extrapolation of functional, statistical and diagnostic information related to the monitored electric appliance.

The flexibility of the monitoring device 9 allows it to be used for several applications and in several monitoring systems, differing from one another in both the typology of the monitored electric appliance and the purpose of the monitoring system.

A particular application of the monitoring system 9 exploiting the inventive concepts explained in the present description and in the annexed claims, being very useful for the manufacturers of washing machines, allows to obtain information about the usage of the machine by a user.

According to such an application, the monitored electric appliance is a laundry washing machine or washing/drying machine adapted to perform at least one wash treatment on textile items. At least one sensing device is associated with the washing machine, preferably being capable of detecting at least one physical quantity among the following: weight of the textile items being present in the basket of the washing machine or washing/drying machine, flow rate of the water supplied to the washing machine or washing/drying machine, temperature of the washing liquid contained in the tub of the washing machine or washing/drying machine, and conductivity of the washing liquid drained by the washing machine or washing/drying machine, said washing liquid comprising water and at least one washing agent. At a remote location, a remote center being similar to the previously described remote center 83 collects a plurality of information sent by the monitoring system, in order to identify at least one parameter related to the usage of the washing machine or washing/drying machine by its user. Said at least one parameter is preferably one of the following: number of wash treatments performed by the washing machine or washing/drying machine within a predefined time interval, quantity and typology of the textile items loaded on average by the user for each wash treatment, quantity and typology of the washing agents loaded on average by the user for each wash treatment, average quantity of water used by the washing machine or washing/drying machine for each wash treatment, and average electric energy absorbed by the washing or washing/drying machine for each wash treatment.

The present invention has been described with particular reference to a specific embodiment example, but it is clear that many changes are possible for those skilled in the art without departing from the scope defined by the annexed claims.

The invention claimed is:

1. A monitoring system for monitoring a household electric appliance, the monitoring system, that is interposed between the household electric appliance and a power outlet, comprising:
   i. a read and write memory storing a plurality of measurements of a plurality of physical quantities relating to the household electric appliance within a predetermined time period during a treatment cycle;
   ii. a first interface means to connect to one or more sensors located on the household electric appliance for measuring said plurality of physical quantities of the household electric appliance, including one or more internal sensors for measuring internal physical quantities and one or more external sensors for measuring external physical quantities;
   iii. a means for measuring at least one electric quantity by measuring an electric current running from the power outlet through the monitoring system that is external to the household electric appliance;
   iv. a storage means containing one or more predefined values of at least one of said plurality of physical quantities;
   v. a microcontroller to process a particular combination of at least one of said plurality of physical quantities associated with at least one sensor of the one or more sensors located on the household electric appliance and the at least one electric quantity to determine values of an actual combination at an instant in time, the microcontroller being further configured to compare said values of an actual combination to one or more respective predefined values contained in the storage means to determine at least one piece of information, each predefined value being a threshold value against which one of the actual values is compared to determine a proper operation of a particular component of the appliance at that instant in time;
   vi. said microcontroller being further configured to adapt the operation of the household appliance; and
   vii. a second interface means to send the at least one piece of information to a remote center for storage.

2. The monitoring system as in claim 1, further comprising:
   a wireless communication device within the first interface means, the wireless communication device communicating with the one or more internal sensors within the household electric appliance where the one or more internal sensors measure a physical quantity of an internal part of the household electric appliance, said wireless communication device also adapted to function as a dedicated communication network that couples the one or more external sensors that sense the external physical quantities to said first interface means, and further adapted to report electrical measurements; and
   the microcontroller being adapted to further process the electrical measurements received from the wireless communication device.

3. The monitoring system of claim 1, further comprising:
   a timing unit, where the timing unit determines a time to be associated with the measurements of the plurality of physical quantities and the at least one electric quantity.

4. The monitoring system of claim 1, wherein the at least one electric quantity includes at least one of: momentary electric current drawn by the household electric appliance, line voltage applied to the household electric appliance, momentary electric power drawn by the household electric appliance, electric energy consumption of the household electric appliance within a predefined time period, a power factor of a load represented by the household electric appliance, $\cos(\Phi)$ of the load represented by the household electric appliance, and type of reactive power of the load represented by the household electric appliance.

5. The monitoring system of claim 1, wherein the first interface is connected to the one or more sensors through a wireless connection.

6. The monitoring system of claim 1, wherein the second interface means is connected to the remote center through a wireless connection.

7. The monitoring system of claim 1, wherein at least one physical quantity of the plurality of physical quantities includes at least one of: temperature, flow rate, conductivity, weight, absolute humidity, relative humidity, pressure, linear displacement, linear velocity, linear acceleration, angular displacement, angular velocity, angular acceleration, chemical concentration, sound pressure, sound intensity, light intensity, oscillation frequency, and oscillation amplitude.

8. The monitoring system of claim 1, further comprising:
   an information storage means for storing the at least one piece of information in the read and write memory.

9. The monitoring system in claim 1, wherein the household electric appliance is one of a laundry washing machine and a washing/drying machine adapted to perform at least one wash treatment on textile items, said at least one physical quantity being preferably at least one of the following: weight of the textile items being present in a basket of the washing machine or the washing/drying machine, flow rate of water supplied to the washing machine or the washing/drying machine, temperature of washing liquid contained in a tub of the washing machine or the washing/drying machine, and conductivity of the washing liquid drained by the washing machine or the washing/drying machine, where the washing liquid comprises water and at least one washing agent.

10. The monitoring system as defined in claim 1 wherein the external sensors comprise:
    a flow sensor positioned along an associated inlet pipe and adapted to measure water flow rate supplied to the household electric appliance; and a conductivity sensor positioned along a drain pipe adapted to measure the conductivity of washing liquid drained from the household electric appliance.

11. A monitoring system for use with a household electric appliance, the monitoring system, that is interposed between the household electric appliance and a power outlet, comprising:
    i. a read and write memory storing a plurality of measurements of a plurality of internal physical quantities, a plurality of external physical quantities and a plurality of electrical quantities that are related to the household electric appliance, said measurements being taken within a predetermined time period during a treatment cycle,;
    ii. a first interface means to connect a dedicated external communications network to a plurality of external physical sensors, which measure said plurality of external physical quantities, and further having means for coupling a plurality of internal physical sensors for measuring said plurality of internal physical quantities, where the plurality of internal physical sensors are connected to the monitoring system by way of an electronic control means and the first interface means;
    iii. a means for measuring at least one electric quantity by measuring an electric current running from the power outlet through the monitoring system that is external the household electric appliance;

iv. a microcontroller configured to:
  a) process measurements of a combination of the least one electric quantity and one or more of said plurality of external physical quantities and plurality of said internal physical quantities to determine at least one piece of information relating to or being employed in said treatment cycle during operation of the household electric appliance,
  b) compare the combination to a predefined value associated with the operation of the household electric appliance, and
  c) drive the electronic control means which functions to adapt the operation of the household electric appliance, and
v. an information storage means for storing the at least one piece of information in the read and write memory.

12. The monitoring system of claim 11, wherein the household electric appliance includes one of: a clothes dryer, a washing/drying machine, a dishwasher, a refrigerator, a freezer, a refrigerator/freezer, an electric oven, a gas oven, a microwave oven, a gas cooking top, an electric cooking top, a magnetic induction cooking top, a kitchen hood, a conditioner, a gas boiler, an electric water heater, an air conditioner, a hair dryer, an iron, a Hi-Fi system, a mixer or any other electric kitchenware, a lighting device, an alarm device.

13. The monitoring system of claim 11, wherein the first interface means is an electric cable to the plurality of external physical sensors.

14. The monitoring system of claim 11, wherein the first interface means is wirelessly connected to the plurality of external physical sensors.

15. The monitoring system of claim 11, wherein the first interface means is connected to the plurality of external physical sensors.

16. The monitoring system of claim 11, wherein the plurality of internal physical sensors are connected through the electronic control means, where the electronic control means collects, stores, and processes measurements from the plurality of internal physical quantities of the plurality of internal physical sensors.

* * * * *